United States Patent
Baatz et al.

(10) Patent No.: US 8,387,916 B2
(45) Date of Patent: Mar. 5, 2013

(54) GALLEY AND METHOD OF CATERING FOR PASSENGERS ON AN AIRCRAFT

(75) Inventors: Andreas Baatz, Sauensiek (DE); Joyce Tan, Hamburg (DE); Jonathan Short, Hamburg (DE); Robert Henshaw, Newnan, GA (US); Mark Londborg, Atlanta, GA (US); Steve Casey, Santa Barbara, CA (US)

(73) Assignee: Airbus Operations GmbH, Hamburg (DE)

( * ) Notice: Subject to any disclaimer, the term of this patent is extended or adjusted under 35 U.S.C. 154(b) by 665 days.

(21) Appl. No.: 12/279,857

(22) PCT Filed: Feb. 24, 2006

(86) PCT No.: PCT/EP2006/060259
§ 371 (c)(1),
(2), (4) Date: Jun. 17, 2009

(87) PCT Pub. No.: WO2007/096000
PCT Pub. Date: Aug. 30, 2007

(65) Prior Publication Data
US 2009/0314889 A1  Dec. 24, 2009

(51) Int. Cl.
*B64D 11/04* (2006.01)
(52) U.S. Cl. ............ 244/118.5; 312/198; 312/201; 244/118.1
(58) Field of Classification Search ......... 244/118.1, 244/118.2, 118.5; 312/107, 108, 198, 201, 312/249.8, 249.9
See application file for complete search history.

(56) References Cited

U.S. PATENT DOCUMENTS

| | | | |
|---|---|---|---|
| 2,854,307 A | 9/1958 | Bridges et al. | |
| 3,472,219 A | 10/1969 | Roy et al. | |
| 4,055,317 A | 10/1977 | Greiss | |
| 4,361,014 A * | 11/1982 | Blain | 62/237 |
| RE32,176 E * | 6/1986 | Vernon | 244/118.5 |
| 5,322,244 A | 6/1994 | Sprenger et al. | |
| 6,761,332 B1 | 7/2004 | Bengtsson | |
| 6,928,236 B2 * | 8/2005 | Suzuki et al. | 392/444 |
| 7,080,806 B2 * | 7/2006 | Mills | 244/118.1 |
| 7,159,821 B2 * | 1/2007 | Harrington et al. | 244/118.5 |
| 7,565,903 B2 * | 7/2009 | Sasaki et al. | 126/24 |

(Continued)

FOREIGN PATENT DOCUMENTS

| DE | 4029628 C | 10/1991 |
|---|---|---|
| DE | 102007029677 A1 * | 1/2009 |

(Continued)

OTHER PUBLICATIONS

Russian Office Action mailed Apr. 21, 2010.

(Continued)

*Primary Examiner* — Benjamin P Lee
(74) *Attorney, Agent, or Firm* — Perman & Green, LLP

(57) ABSTRACT

A galley including a galley body on a cabin floor for accommodating storage boxes, appliances and at least one service cart; storage boxes for storing goods, and a service cart. The galley body has a plurality of vertical levels that are substantially equidistant from each other, each of the vertical levels divided into a plurality of laterally adjacent compartments whose horizontal and vertical dimensions are equal to an integer multiple of the respective dimensions of a single one of the storage boxes. A transfer table is provided in front of the galley body for access to the compartments. A method includes catering for passengers on an aircraft.

19 Claims, 6 Drawing Sheets

U.S. PATENT DOCUMENTS

| | | | |
|---|---|---|---|
| 7,584,926 B2* | 9/2009 | Harrington et al. | 244/118.5 |
| 7,780,114 B2* | 8/2010 | Doebertin et al. | 244/118.5 |
| 7,954,761 B2* | 6/2011 | Johnson et al. | 244/118.5 |
| 2001/0050519 A1* | 12/2001 | Kasuya | 312/315 |
| 2005/0070152 A1 | 3/2005 | Suzuki et al. | |
| 2005/0133308 A1* | 6/2005 | Reysa et al. | 186/40 |
| 2005/0224646 A1* | 10/2005 | Mills | 244/118.5 |
| 2006/0060181 A1* | 3/2006 | Sasaki et al. | 126/21 A |
| 2006/0145002 A1* | 7/2006 | Van Loon | 244/118.1 |
| 2007/0228216 A1* | 10/2007 | Wenstrom | 244/118.5 |
| 2008/0001031 A1* | 1/2008 | Doebertin et al. | 244/118.1 |
| 2008/0150406 A1* | 6/2008 | Arnold et al. | 312/237 |
| 2010/0065681 A1* | 3/2010 | Gonnsen et al. | 244/118.5 |
| 2010/0140398 A1* | 6/2010 | Cunningham et al. | 244/118.5 |
| 2010/0213801 A1* | 8/2010 | Ceballos-Godefroy | 312/249.8 |
| 2011/0114788 A1* | 5/2011 | Mosler et al. | 244/118.5 |

FOREIGN PATENT DOCUMENTS

| | | |
|---|---|---|
| EP | 0661015 A | 7/1995 |
| EP | 1520783 A | 4/2005 |
| WO | 2004009444 A | 7/2005 |
| WO | 2005066022 A2 | 7/2005 |

OTHER PUBLICATIONS

A.I. Dobryansky, Prefabricated Demountable Structures for Organizational Technical Equipment, Mashinostroenie Publishers, Moscow, 1968, p. 101, lines 26-40, p. 102, line 1-4, 35-37.
International Search Report dated Oct. 1, 2003.
International Search Report dated May 12, 2006.
Chinese Office Action mailed Apr. 28, 2010.

* cited by examiner

GALLEY AND METHOD OF CATERING FOR PASSENGERS ON AN AIRCRAFT

CROSS REFERENCE TO RELATED APPLICATIONS

This application is the National Stage of International Application No. PCT/EP2006/060259, International Filing Date, 24 Feb. 2006, which designated the United States of America, and which International Application was published under PCT Article 21 (2) as WO Publication No. WO2007/096000, the disclosure of which is incorporated herein by reference in its entirety.

FIELD

The disclosed embodiments relate to a galley and a method of catering for passengers on an aircraft.

DESCRIPTION OF THE RELATED ART

In the limited closed space in an aircraft one often has a situation in which little room is left for utility spaces like lavatory and galley units. This problem is getting worse the longer distances an aircraft can fly, since on long distance flights the demand for such utility spaces increases more than proportionally. In particular galleys should provide sufficient space without reducing the space for passenger seats in an aircraft.

On the other hand a galley and other comparable units aboard an aircraft are supposed to offer all possibilities of a higher gastronomy and catering services.

Accordingly from US 2001/0050519 a galley unit for an aircraft is known that is equipped with a counter, a decorating wall, and a cabinet. This equipment is provided to at least one wall surface of a box body (closet), and a door member with at least its outer wall surfaces made of a special fireproof material. The door members are movable between a first position for covering the wall surface provided with said utility mechanism, and a second position for opening the wall surface. The door members could be folded, and when in the second position the counters or cabinet are moved and placed on the side wall surface.

From WO 2004/009444 a modular galley for an aircraft or train is known. The modular galley comprises a wall provided with a multiplicity of guides running in the vertical direction with undercuts as well as a multiplicity of essentially block-shaped modules with runners on the rear that can be accommodated in the undercut slots. The modular galley furthermore comprises lifting means for raising or lowering a said module, the runners of which have been accommodated in a said undercut slot, over the wall.

From WO 2005/066022 a mobile platform galley cart storage and retrieval system is known which includes a plurality of joined walls defining a galley area. A plurality of mobile carts are stored in the galley area, including at least a first side-by-side subgroup of carts and a second side-by-side subgroup of carts positioned above the first subgroup. An optional third subgroup is positioned above the second subgroup. An automatic transfer system lifts and horizontally transfers carts to predetermined storage locations on racks supporting each elevated subgroup of carts. The carts are stored in either randomly accessible locations or in first-in/first-out locations.

However, the above exemplary prior art galleys suffer from poor ergonomics with corresponding drawbacks as to their handling by the crew members who are responsible for the service aboard. Since further there is a great diversity of elements in the prior art galleys, namely containers, boxes, service carts, appliances etc., which are not standardized a correspondingly great number of service routines have to be learned by the attendant crew. In some cases containers or boxes even do not work in a systematic fashion with their transport carts, i.e. trolleys, so that menu boxes do not fit into trolleys or cannot be secured onto them. This requires that objects must be individually transferred between boxes and trolleys. Hence standardization of galley elements is desirable, also in order to make galley elements more efficient concerning use of space and sorting in of goods. In addition, in some cases only a first-in/last-out stack order is allowed which is less efficient as to the storage capacity than desired.

Further, the flexibility as to the arrangement of hot or cold areas in the galley is reduced with most prior art galleys since heating/cooling means are provided in the trolleys. Consequently cooling and heating is restricted to lower compartments in the prior art where the trolleys are located. On the other hand the layout of the lower compartments is determined by the fact that these lower compartments are to accommodate the trolleys, and there is no space for pipes and ducts for air supply to upper compartments in the lower part compartments. Additional design constraints for the galley concept are imposed by e.g. the required accessibility of the trolley compartments in the galley.

Moreover prior art galleys show a lack of flexibility as to customization. It is often desirable for air carriers to have an interior design of their aircrafts that distinguishes them from other carriers. With prior art galleys such customization is only feasible by re-designing the complete galley.

SUMMARY

The disclosed embodiments aim to provide a well-appointed galley offering all possibilities of a higher gastronomy and catering services without reducing the space for passenger seats in an aircraft and which overcomes the above constraints.

The aspects of the disclosed embodiments are directed to a galley and a catering method.

The galley according to the disclosed embodiments comprises a galley body with multiple vertical levels. The levels in turn are subdivided into a plurality of laterally disposed storage compartments. The multiple vertical levels are substantially equidistant from each other; the lowest level is slightly above floor of the galley so that input/output ports for air supply may be accommodated underneath the lowest vertical level. The input/output ports are connected to predetermined compartments so as to allow for air exchange between the respective compartment and outside.

According to the disclosed embodiments there is provided a galley unit for an aircraft comprising: a galley body being fixed on a cabin floor for accommodating a plurality of storage boxes, appliances and at least one service cart; a plurality of storage boxes for storing goods; and a service cart for conveying goods. Said galley unit is characterized in that said galley body has multiple vertical levels that are substantially equidistant from each other, wherein each of said vertical levels is subdivided into a plurality of laterally adjacent compartments whose horizontal and vertical dimensions are equal to an integer multiple of the respective dimensions of a single one of said storage boxes; and a transfer table is provided movable in front of said galley body for access to each of said multiple compartments.

The galley unit according to the disclosed embodiments may embody one or—if appropriate—multiple of the following features:

said galley body is subdivided into an upper part and a lower part with predetermined upper part compartments having a depth that is smaller than the depth of the lower part compartments so as to define a work recess above said lower part compartments;

predetermined compartments on at least two different vertical levels above each other are combined to form a composite compartment;

said composite compartment comprises a compartment frame for accommodating a plurality of boxes and a frame base underneath said frame so as to render said composite compartment extractable from said galley body as a service island;

said at least two different levels above each other are the two lowest levels in said galley body and said frame base is adapted to support said frame on the cabin floor;

the lowest of said multiple vertical levels is positioned at least partly in a predetermined distance above said floor so as to accommodate at least one inlet/outlet port underneath said lowest level which inlet/outlet port is connected to at least one predetermined compartment for air supply;

said composite compartment of the two lowest levels is open to the floor so that a service cart may be inserted into said composite compartment;

each of predetermined compartments comprises a hatch with a compartment door that closes flush with the galley body in a closed position and opens said hatch in an open position;

each of a predetermined number of compartments is adapted to accommodate two boxes being successively arranged one behind the other and comprises a pair of rails with a push/pull mechanism for automatically releasing the box in the rear of the compartment when the box in the front of the compartment has been discharged;

said transfer table is mounted in front of said galley body slidable in vertical and horizontal directions;

said transfer table is mounted to a single support;

said transfer table has an operational position being substantially horizontal and an idle position being substantially vertical with respect to said galley body;

said service cart may take on either a folded position or a deployed position and at least one compartment is adapted to accommodate said service cart in its folded position;

electric appliances are provided in predetermined compartments said appliances being chosen from the group of electric heaters, electric freezers, electric ovens etc.;

said electric appliances are "plug-and-play" appliances; and standardized electric, water and heat pipe connectors are provided in a predetermined number of compartments.

The corresponding method of catering for flight passengers of an aircraft in a galley with the steps of storing goods in a plurality of storage boxes; conveying a plurality of said storage boxes to and from said galley by at least one service cart; and accommodating a plurality of said storage boxes, appliances and the at least one service cart in the galley in a galley body being fixed on a cabin floor, is characterized by providing standard boxes as storage boxes having a predetermined width, a predetermined depth and a predetermined height; arranging said standard boxes in said at least one service cart, wherein the horizontal and vertical dimensions of said service cart are equal to an integer multiple of the respective dimensions of a single one of said standard boxes and conveying said standard boxes to said galley by said service cart; discharging said standard boxes from said at least one service cart and mounting them on a transfer table; and transporting said standard boxes to their respective destination compartment in said galley body and stowing them therein, wherein the horizontal and vertical dimensions of each of said compartments are equal to an integer multiple of the respective dimensions of a single one of said standard boxes.

Preferably there are conducted the additional steps folding and unfolding said service cart after all standard boxes have been loaded and unloaded, respectively; and accommodating said service cart in its folded state in a predetermined compartment and retrieving said service cart in its folded state from said predetermined compartment, respectively.

With the disclosed embodiments several advantages over the prior art are realized. Inter alia a standardization of galley components is feasible. This in turn results in a simplified handling of the components reducing instruction procedures and training effort for the crew. In particular the standardization of boxes and trolleys simplifies the handling thereof and storage operations. Also the design of the galley is facilitated in that efficient cooling/heating of service boxes is feasible also in upper storage areas now; packing density is more efficient than with the prior art; containers/boxes work in a systematic fashion with the trolleys; service boxes fit into or slide & secure onto the top of the trolleys; galley bodies are conducive to customization of upper area end-caps; 1st & 2nd level storage area allows for greater thermal efficiency due to the bottom shelf and sliding doors; construction of the lower compartments with bottom shelf increases the mounting flexibility of the galley body in the aircraft; the bottom shelf under level 1 allows heating ducts to be placed close to the floor area of the galley complex for improved thermal comfort in the galley.

BEST MODE FOR CARRYING OUT THE DISCLOSED EMBODIMENTS

Figure 1:
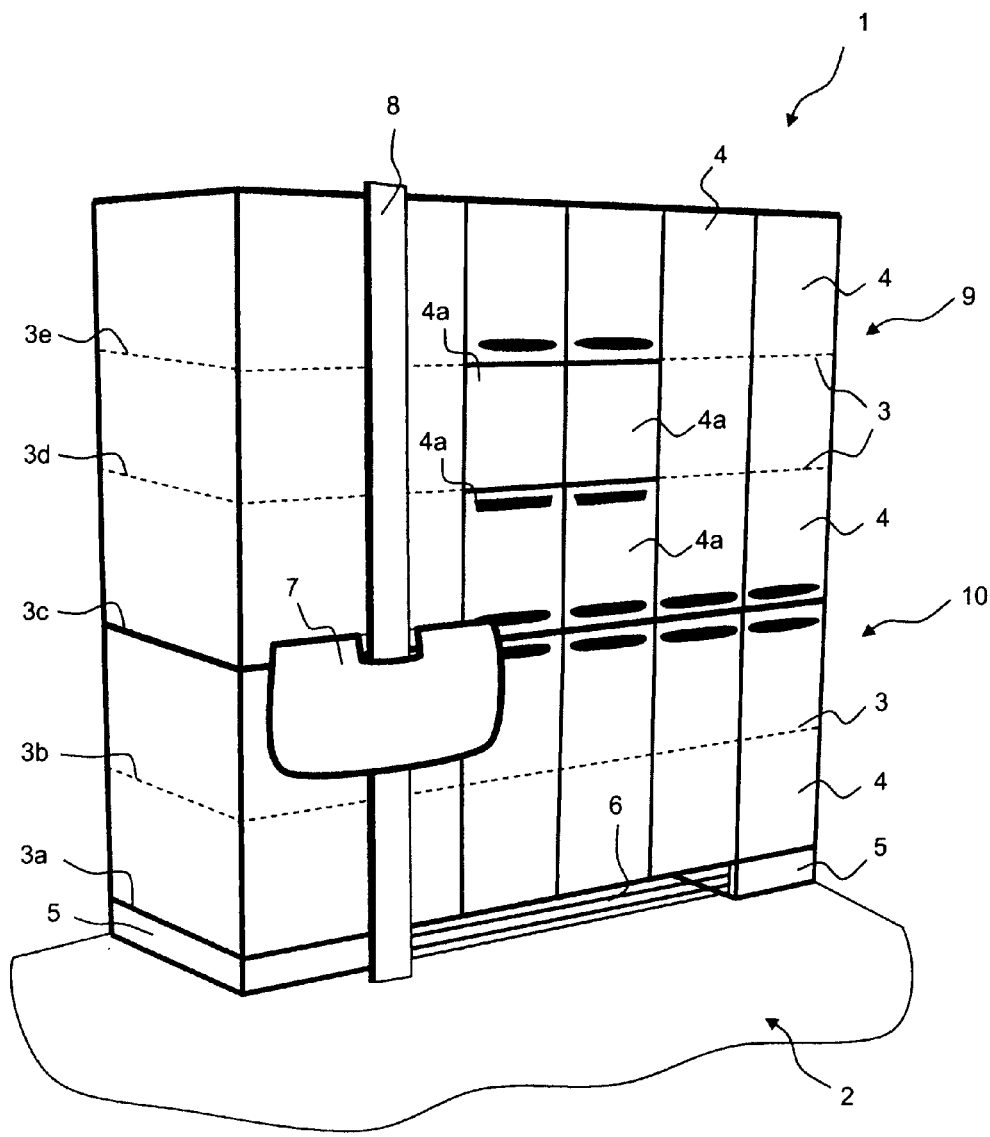
FIG. 1 is a schematic overall perspective view of the galley body of the galley unit according to the present invention.

The best mode for carrying out the disclosed embodiments will be explained referring to the drawings. The drawings are not to scale. Equal reference numerals in the drawings refer to equal or equivalent means.

In FIG. 1 the galley according to the disclosed embodiments is shown with a galley body 1 (also named monument)

that is fixed to the seatrails (not shown) or hardpoints (not shown) of the galley unit. In the following the body 1 will be described as to be fixed to the floor 2 although it is clear to a skilled person that it is actually mounted to said floor structure with seatrails and hardpoints underneath the visible floor panels. The body 1 may either extend and be fastened to an upper aircraft structure (not shown) that holds the cabin ceiling (not shown) or the body 1 may be provided with an own ceiling (not shown) independent of the cabin ceiling and stand independent of the cabin ceiling.

The galley body 1 is generally constructed of a fireproof panel material and may accommodate storage boxes, appliances and service cart(s). In the storage boxes goods may be stored, and the appliances are e.g. chosen from the group comprising electric freezers, electric heaters, electric ovens etc., and in particular microwave-ovens. A service cart may be provided for conveying goods to and from said galley body 1.

The galley body 1 according to the disclosed embodiments has a plurality of vertical levels 3 which are substantially equidistant from each other. Generally these vertically separated levels are realized as shelves. The levels 3 are indicated in FIG. 1 by dashed horizontal lines. In the embodiment of FIG. 1 there are five vertical levels 3a through 3e with 3a being the lowermost level and 3e the uppermost level.

The vertical levels 3 are subdivided into a plurality of laterally adjacent compartments 4 as appropriate. In such compartments 4 there is space to accommodate storage boxes of certain dimensions. In other words, the compartments are standardized and are adapted to the storage boxes in use in that their horizontal and vertical dimensions are equal to an integer multiple of the respective dimensions of a single storage box. Thus the compartments according to the disclosed embodiments present either a storage unit or a multiple of storage units. This will be explained in greater detail further below.

However, although the compartments 4 are adapted to the storage boxes by their size there are compartments provided in the galley body 1 that house permanent installations rather than accommodate temporarily varying loads such as transportation boxes. For example specific compartments may be reserved for electric appliances. These compartments are referred to by 4a and are distinguished by their shaded front in FIG. 1. The electric appliances are preferably "plug-and-play" appliances allowing an uncomplicated substitution of a respective appliance in case of failure at the next turn-around of the aircraft. Accordingly the electric, heat and water connectors of the appliances (not shown) are standardized which in turn also enables the exchange of different appliances such as oven and freezers or beverage makers and boxes etc. Preferably the connectors are provided on a distinct board (not shown) in the rear of the respective compartment which is supplied by a power unit (not shown) that is favourably positioned offside from the mainly used compartments, e.g. in one of the uppermost compartments in the galley.

It will be appreciated that if appliances require more space than one compartment two or more compartments may be linked together. Clearly this also applies to compartments that are exclusively dedicated to storage boxes so that even double size, triple size etc. boxes may be used.

Particularly with electric appliances one often encounters the problem of heat exchange. In a preferred embodiment there are heat pipes provided (not shown) in order to carry off heat from the respective compartment. On their first side the heat pipes are connected with the respective compartment, preferably at the rear side of the galley body 1. On their other side they end in a space underneath the lowest shelf 3a just above the cabin floor 2 behind a grille 6 under the front of the galley body 1 so as to ensure unimpeded air exchange between the respective compartment and outside. The required air stream in the suction pipes and exhaust pipes may be enhanced and controlled by appropriate means (not shown) such as pumps and valves.

The compartments 4 may be covered either each by their own front door or there may be a common front door for multiple compartments. Details of united compartments will be given below.

Storage boxes being delivered in a service cart have to be transported to their respective compartments which may be on a higher shelf. For this transport a transfer table 7 is provided that is movable in front of said galley body 1. The transfer table 7 is mounted to a support 8, which is a single support 8 in the embodiment of FIG. 1. For access to any of said compartments 4 the transfer table 7 is lifted and lowered in vertical direction on said support 8. The support 8 in turn is mounted to rails (not shown) so that it is moveable in horizontal direction along the front of the galley body 1. With this arrangement all compartments 4 of the galley body 1 are accessible for stowing boxes therein by the transfer table 7. The support 8 is mounted to a first set of rails (not shown). This first set of rails may be provided at the top of the galley body 1 or at the foot of the galley body 1. If the rails are positioned at the foot of the galley body they may be buried either in the floor 2 or in the galley body 1 itself. In addition the support 8 is fastened to a second set of rails (not shown) in the galley body 1 in order to stabilize it in its vertical direction and to prevent it from being pulled away from the body 1. In other words a secondary anchor is located either in the middle or at lower end of the support for the transfer table 8. Other arrangements of the transfer table support 8 are conceivable as well without departing from the principle of these disclosed embodiments, in particular there may be more than one supports 8 namely two or three in parallel to which the table is fastened.

In the embodiments in FIGS. 1, 2, 4, 5 and 7 the galley body 1 is divided into an upper part 9 and a lower part 10. Preferably the height of the lower part 10 corresponds to two compartments above each other and the height of the upper part 9 corresponds to three compartments above each other. Thus an ergonomically satisfying partition of the galley body 1 is achieved wherein the height of the lower part 10 is in the range of 70 cm to 110 cm, preferably in the range of 80 cm to 100 cm and more preferably in the range of 85 cm to 95 cm. The exact height will depend on the vertical dimension of a single standard box.

Figure 2:
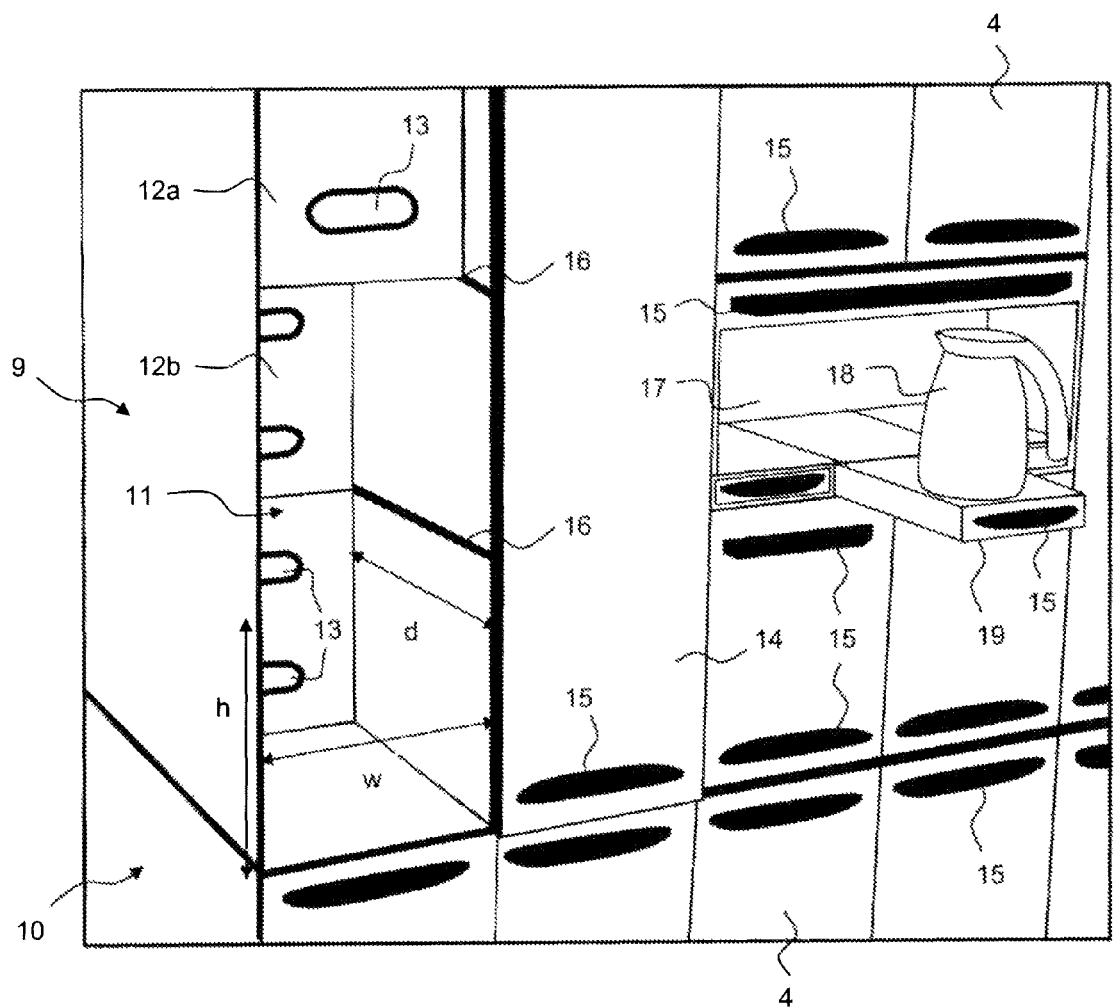
FIG. 2 is another partial perspective view of the galley unit according to the present invention showing multiple boxes in a compartment and beverage containers.

A more detailed view of the body 1 is shown in FIG. 2. In FIG. 2 the upper part 9 of the galley body 1 is shown enlarged and there is a compartment on the left side in FIG. 2 in which multiple boxes can be stored. In this embodiment three compartments above each other are linked together so as to provide one composite compartment with storage room over three levels in the upper part 9 of the body 1. The three compartments are provided with one common door 14. On each level there is room for a pair of standard boxes behind one another.

Figure 3:
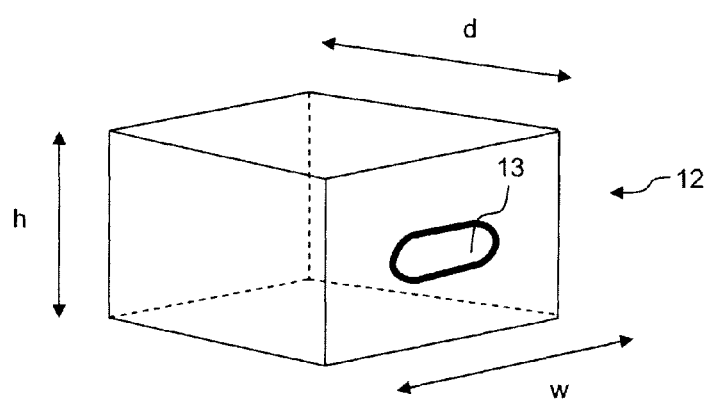
FIG. 3 is a perspective view of an illustrative semi-transparent standard transportation/storage box according to the invention.
Figure 4:
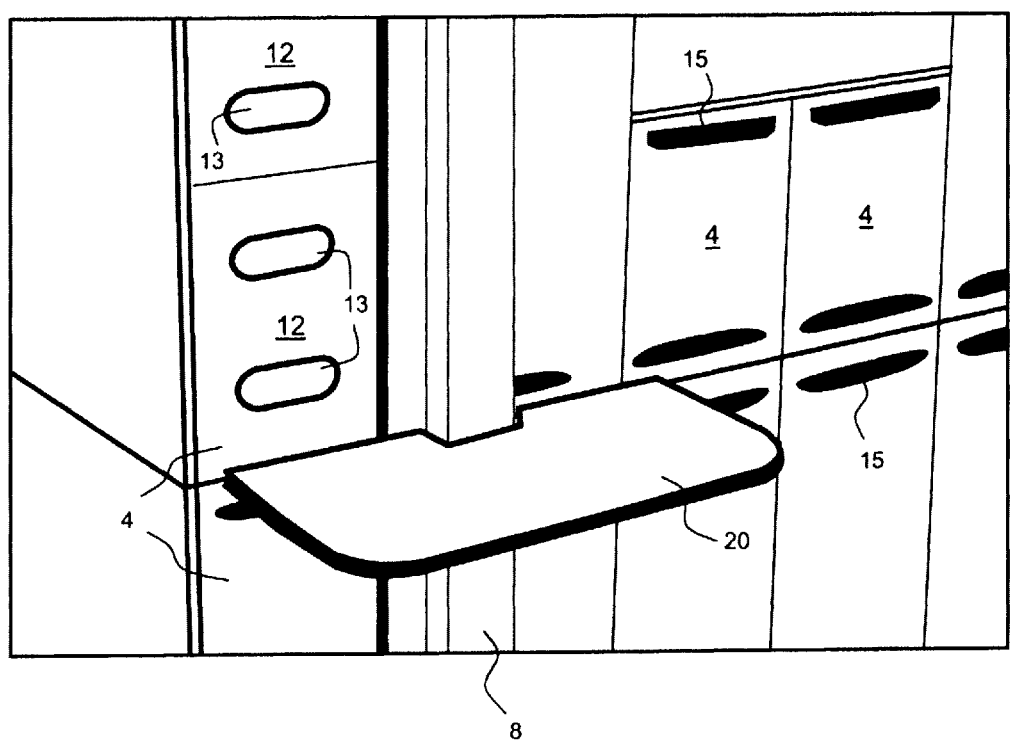
FIG. 4 is a partial perspective view of the galley body of the galley unit according to the present invention showing the transfer table in its operational position.

A standard box 12 for the compartments is shown in FIG. 3 for explanation. The standard box 12 for the galley according to the disclosed embodiments has a width "w", a height "h", and a depth "d". For manipulating the boxes these are provided with box handles 13 such as simple openings, apertures, recesses etc. The height of such a standard box lies in the range of 20 cm to 35 cm, which in turn defines the height of the upper and the lower part body 1 between 70 cm and 110 cm, as it was explained above.

Referring back to FIG. 2, with this relation between compartment and box dimensions there are six boxes disposed in the composite compartment on the left hand side. Accordingly the composite compartment has a width w, corresponding to the width w of the standard box 12, a height 3×h, corresponding to three times the height h of a standard box 12, and a depth 2×d, corresponding to twice the depth d of a standard box 12. In FIG. 2 boxes on three levels are visible. On the uppermost level there are two boxes behind one another of which only the box 12a in the front is shown. On the two lower levels there is only one box 12b in the rear, the boxes in the front are discharged, and the space for a box in the front is still empty.

Those compartments which are to accommodate two or more boxes behind each other are preferably equipped with a push/pull mechanism (not shown) for releasing boxes in the rear, if the box in the front has been discharged. The push/pull mechanism is combined with sliding mechanisms. In other words there are no shelves between the compartment units yet only sliding rails/brackets are provided instead. By this the weight of the galley body is reduced. The rails or brackets on which the boxes rest are shown in FIG. 2 as reference 16. These rails or brackets are designed to sustain the load of the boxes in the compartment.

In this context it should be noted that not only standard boxes may be used for the compartments but that also larger size boxes may be employed such as a double length or threefold length boxes. These are particularly apt for use in compound compartments, e.g. compartments which were initially designed for beverage makers and oven units (see below).

The boxes are loaded into the composite compartment through a hatch 11. The hatch 11 is closed during start and landing by a compartment door 14 so as to secure the inserted boxes as well as to beautify the overall appearance of the galley body 1. To that order the compartment door may be provided with decorations. In the embodiment of FIG. 2 the compartment door 14 is mounted slidable in rails (not shown) in the body 1 and closes flush with the front of the galley body 1 in its closed position. On the other side, when the hatch 11 is open for receiving boxes and other items to be disposed in the compartment, the door 14 slightly protrudes from the front surface of the galley body. This is indicated in FIG. 2 where the left edge of the open door 14 is discernible.

In order to make the doors 14 operable for the crew there are door grips 15 or handles of another type provided on them. Predominantly the doors are furnished with one single door grip 15 at either their lower end or their upper end, depending on ergonomic considerations. However, if appropriate, the doors may also be equipped with two or more door grips, e.g. one at the head of the door, one at the foot of the door 14. Such a door 14 with two grips 15 at its upper end and at its foot end is shown in the right half of FIG. 2.

In FIG. 2 there is also a compartment 17 depicted that serves as a storage room for a beverage-maker unit with a plurality of pots, jugs and carafes one of which is referred to as 18. For example this beverage maker unit may comprise heating facilities to make and keep e.g. coffee or tea at a desired temperature. In order to facilitate the handling of the jugs 18 the beverage maker 17 is furnished with a set of sliding trays 19 that may be pulled out and therefore is also furnished with an appropriate handle or grip. In the embodiment of FIG. 2 the beverage maker 17 encompasses two compartment units (cells, each of which corresponds to a standard box 12 as to their width) adjacent to each other on the same level. The beverage maker 17 in turn is partitioned so as to provide space for three trays 19 side by side. From this embodiment it should be clear that inside the compartments one is not obliged to maintain a partitioning that is strictly governed by the standard box dimensions, yet any other appropriate partitioning may be provided.

Since boxes 12 are usually filled and weighty when loaded into the galley body 1 there is a need for a versatile transport mechanism to convey the boxes to their destination compartment. On the other hand the transport mechanism should not require too much room for itself, especially when not in use. Such transport mechanism is provided by the transfer table 7 in FIG. 1 which is shown in its operative position as a horizontal plate 20 in FIG. 4. As mentioned already earlier the transfer table 20 is mounted on a support which preferably consists of a single pillar 8. Whereas the actual plate 20 is movable in vertical direction, the pillar itself is movable in horizontal direction in rails (not shown) that are either buried in the galley floor 2 or are disposed on top of the galley body 1. Moreover the plate 20 may be rotated around an axis that is perpendicular to the pillar and lies substantially in the plane of the front of the galley body 1. The benefit of mounting the plate rotatably so as to change its position between horizontal and vertical is that in its vertical position the plate is less obstructing than as being flush with the front of the galley body 1. However other arrangements may be devised as well. For example the plate may be rotatable by 90° around an axis perpendicular to said galley front through the pillar, so that it is still protruding from the galley front thereafter, yet now in a vertical position; then the plate may be rotatable by 180° around another axis that is still perpendicular to the pillar yet lies in the plane of the galley front. By such an operation the plate could be completely buried in a slot (not shown) in the galley body 1 during takeoff and landing. For catering services the plate 20 is pulled out then again from the storage in the direction vertical to the body front surface.

Moreover the plate may be folded in itself in a zigzag fashion along its longitudinal dimension(s) so as to require less space in its retracted position.

Unless in its idle position, i.e. when the transfer table 20 is in its vertical position and does not carry any boxes or other parts on it, with both tilting mechanisms the transfer table 20 may be used also as a bar counter board when brought into its horizontal position thus presenting and/or extending a work surface which will be explained further below.

The driving mechanism (not shown) for the transfer plate 20 as well as for the pillar of the support 8 may be pneumatic or electrical. A pneumatic mechanism could be combined with appropriate dampers and springs and be designed so as to support only manual forces, whereas an electrical mechanism could provide the required forces to their full extent. In both cases the driving mechanism is preferably furnished with a safety means such as a dead man's handle. In addition a rim around the plate 20 may be disposed so as to secure elements on the table against dropping due to tilting, vibrating or other sudden movements of the aircraft during level flight.

Figure 5:
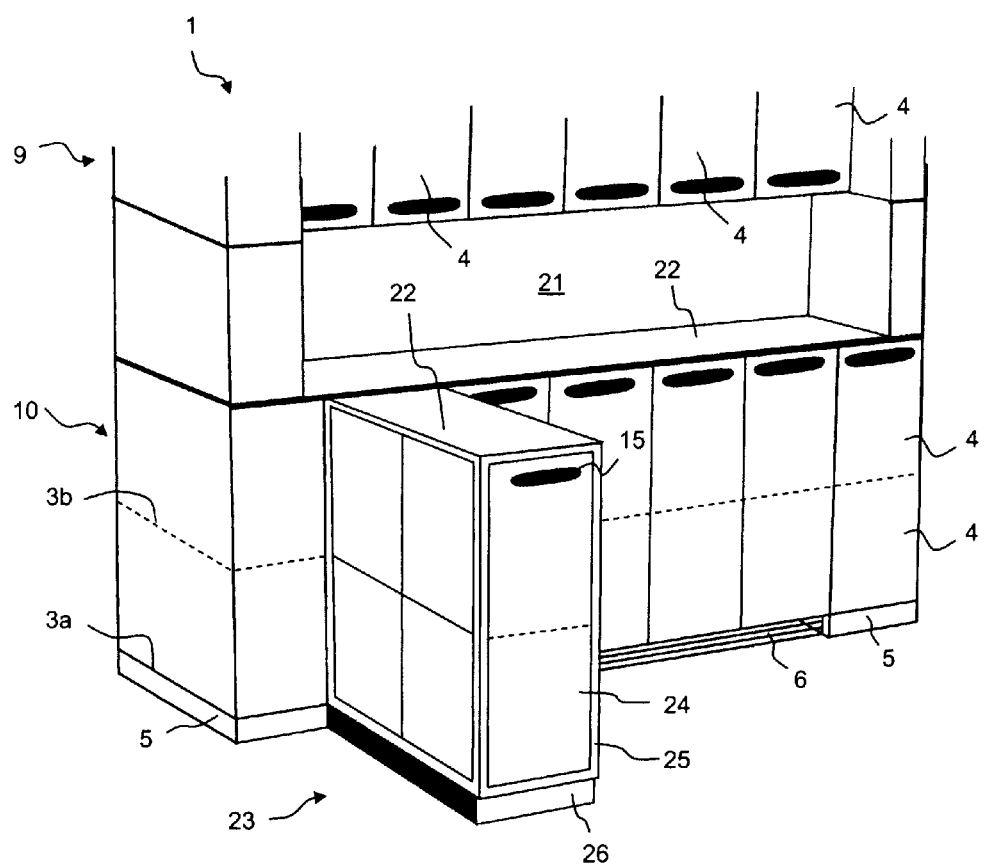
FIG. 5 is still another partial perspective view of the galley unit according to the present invention showing a service island in its extracted position.

If the upper part 9 has a dimension perpendicular to the front of the galley body 1 that is smaller than the corresponding dimension of the lower part 10, a work space is provided above the respective compartments of the lower part 10. In other words if predetermined compartments of the upper part 9 are less deep than the corresponding compartments in the lower part 10 a work surface results around 70 cm to 95 cm above floor which is ergonomically favourable. If only the lowest compartments in the upper part 9 have a smaller depth but there are others above that have the same depth as the lower part compartments again, a work recess is given that is upwardly closed. Such embodiment is shown in FIG. 5. In this embodiment the galley body 1 again is subdivided into an upper part 9 and a lower part 10. However in this embodiment a predetermined number of upper part compartments have a depth that is smaller than the depth of the lower part compartments. E.g. the lower body 10 is provided with a depth corresponding to three standard boxes, and the upper body 9 instead is provided with a depth that corresponds to one standard box only. The compartments 4 of the upper part body 9 are seen offset to the rear in FIG. 5. In this way a work recess 21 is defined with a work surface 22 above the respective lower part compartments. The depth of the work recess depends on the remaining compartments above the lower part body 10. In fact the upper part compartments may even be completely omitted so that the depth of the recess equals the depth of the lower part body 10 and the rear side of the recess 21 thus coincides with the rear side of the galley body 1. In summary, the work recess 21 may either be open upwards or one or two compartment rows may be arranged above it, either with the same depth or with a different depth, e.g. with the uppermost row of compartments protruding the most and the uppermost but one row protruding one box unit less from the rear of the body 1. Such upper compartments above the recess 21 can be used then as a bar compartment with doors where bottles and other loose articles could be stored behind. This bar compartment provides the advantage of easy direct access to the contents wile it also can be closed off in very short time when turbulences occur.

In the work recess there may be provided various work partitions (not shown) and a sink (not shown); a (hot-) water tap (not shown) may be provided in the rear wall of the recess 21 or in one of its lateral walls above the sink; and a hot-water supply unit (not shown) with an electric heater may be provided in one of the compartments 4a for supplying hot water to the hot-water tap. Further appropriate lighting devices (not shown) are mounted to the ceiling of the recess 21 and/or to the side wall(s) of the recess in order to illuminate the recess 21.

The recess 21 may be furnished with a (vertical) blind (not shown) for covering the recess 21 during take off and landing of the aircraft in order to render the galley body 1 more decorative in its idle phases and to cache appliances in the recess 21. The blind may suspend from the compartments above the recess if available. When the galley unit is to be used again as a kitchen facility during level flight, the blind is opened and may either be curled up (when suspending from compartments above the recess) or stored on the side of the recess in a curtain fashion. Also the counter board 20 is pulled out then and is employed for transport of boxes, containers, jugs etc. or as an additional counter and work surface.

The embodiment in FIG. 5 shows an additional feature, namely a service island 23 that is extractable from the galley body 1. By extracting this service island 23 from the galley body 1 the work surface 22 may be enlarged and additionally the storage room under the work surface 22 of the island 23 is accessible from the side. Thus storage in the service island 23 is more efficient and more convenient. For the service island 23 predetermined compartments are combined to form a composite compartment 24. The compartments are above each other on the two lowest vertical levels 3a and 3b. Both compartments 4 of the composite compartment 24 are hold together by a frame 25 that encompasses them. Under the frame 25 a frame base 26 is provided that is adapted to support the frame 25 on the cabin floor 2. This frame base 26 may comprise rollers (not shown) or equivalent means for facilitating the extraction of the island 23 out of the body 1. Like other compartments also the service island 23 is provided with an appropriate handle 15 for manipulation.

The island 23 may either be completely independent of the body 1 or semi-detached to it, so that it is extractable, yet being still coupled to the body—even if fully pulled out, as it is shown in FIG. 5. With a completely independent service island 23 its flexibility is enhanced and the island may be used as a service cart for catering for passengers at their seats. On the other hand the semi-detached island 23 is always secured to the body 1 and even in case of unexpected flight manoeuvres of the aircraft the island 23 is fixed so that it can not tear loose and move uncontrolled.

As indicated in FIG. 5 the grille 6 underneath the lowermost level 3a for suction and exhaust pipes (not shown) from the compartments above is correspondingly narrower since a part of the overall width of the body is required by the island 23 in this embodiment. The body 1 may be mounted on galley body rests 5 on both sides (as shown in FIG. 5) which in turn are fastened to the floor structure underneath with seatrails (not shown) and hardpoints (not shown). However there may also be provided a frame structure with multiple pillars (not shown) distributed over the footprint of the galley body 1 on which the body 1 rests.

Figure 6:
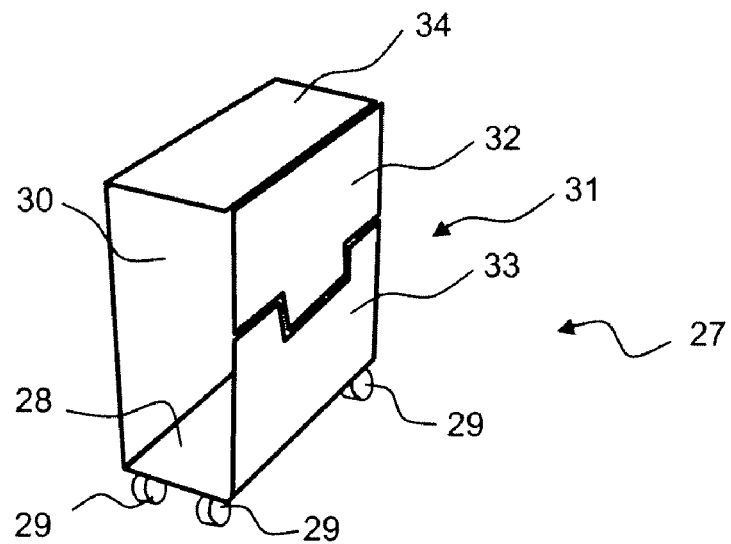
FIG. 6 is an explanatory view of unfolding and folding a foldable service cart showing the respective set up steps in FIGS. 6A, 6B, 6C.
Figure 6:
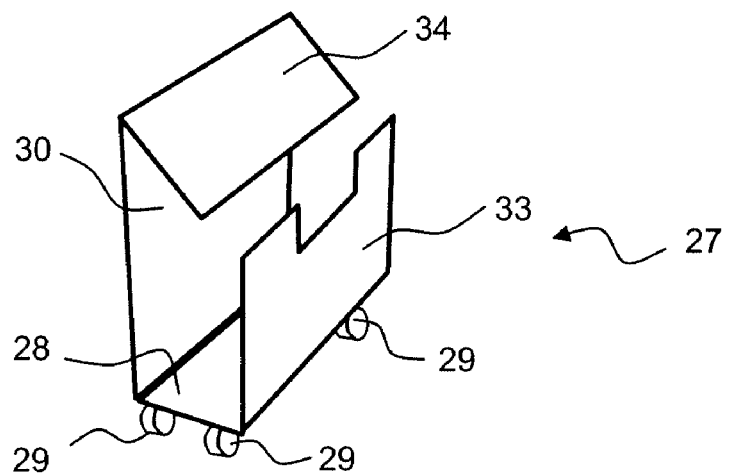
Figure 6:
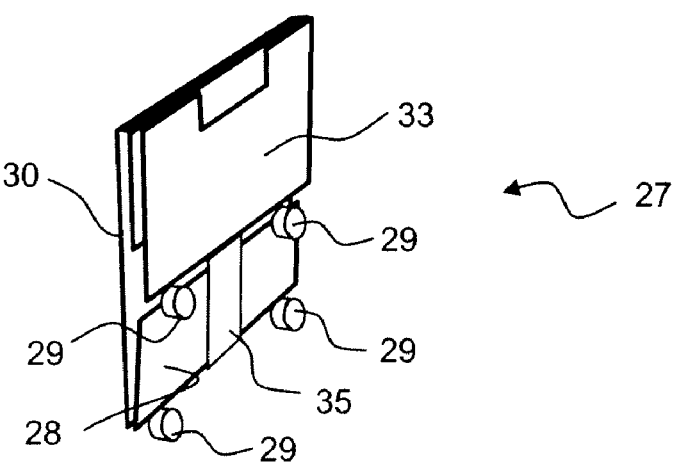

Since the storage room in the galley body 1 is limited, despite the enhanced storage efficiency according to the disclosed embodiments, a service cart 27 is provided in the present galley that is foldable. The folding and unfolding of the cart is shown in FIGS. 6A, 6B, 6C. In FIG. 6A the cart is shown in its unfolded state, that is, in its operational or deployed state. The cart 27 comprises a bottom plate 28 with multiple rollers 29 attached to, usually there are provided four rollers at the plate 28 one at each corner. But depending on the load even three rollers may suffice, or, to the contrary, there may be a need for additional rollers to sustain the weight of the cart 27. The cart further comprises a first side wall 30 which is substantially vertical to the bottom plate 28. On the other side of the bottom plate 28, opposite the first side plate 30, there extends a second side plate 31 which consists of a lower part plate 33 and a removable upper part plate 32. Finally, there is a top plate 34 covering the inside of the cart 27. Further front and rear plates may be provided to cover the inside of the cart (not shown).

In FIG. 6B the cart 27 is partly folded. Whereas the lower part plate 33 is articulated with the bottom plate 28 the upper part plate 32 may either be completely detached or folded to the inside of the cart (not shown). In the embodiment in FIG. 6B the upper part side plate 32 is removed. The top plate 34 is partly tilted in order to indicate the process of folding.

In FIG. 6C the cart 27 is shown in its entirely folded state. In this situation the bottom plate 28 is rotated by 90° towards the first side plate 30 around their common axis, so that both plates are parallel to each other afterwards. Consequently, the lower part plate 33 of the second side plate 31 is also rotated by 90° with respect to its common axis with the bottom plate 28, yet in the opposite sense of rotation so as to be parallel to the first side plate 30, too. The top plate 34 is sandwiched between the first side plate 30 and the lower part plate 33 in the folded state of the cart 27.

In order to strengthen the link between both side plates 30 and 33, a reinforcement plate 35 is disposed between both side plates 30 and 33, which itself is articulated with both plates 30 and 33. The reinforcement plate 35 may also be provided with rollers (not shown). The rollers 29 may be fastened to the bottom plate 28 of the cart in a way to allow them to orient themselves always top down with respect to the cart 27.

Since FIGS. 6A to 6C show the principle of folding the cart 27 only, various means have been omitted in the drawing for sake of clarity. For example the cart will usually be furnished with a grip for manipulating the cart, and the grip may be provided with an automatic brake control similar to a dead man's handle. Moreover, the grip may be adjustable in its inclination towards the main body of the cart 27. Finally there may be more than one grip on a cart, e.g. one grip per side of the cart.

Figure 7:
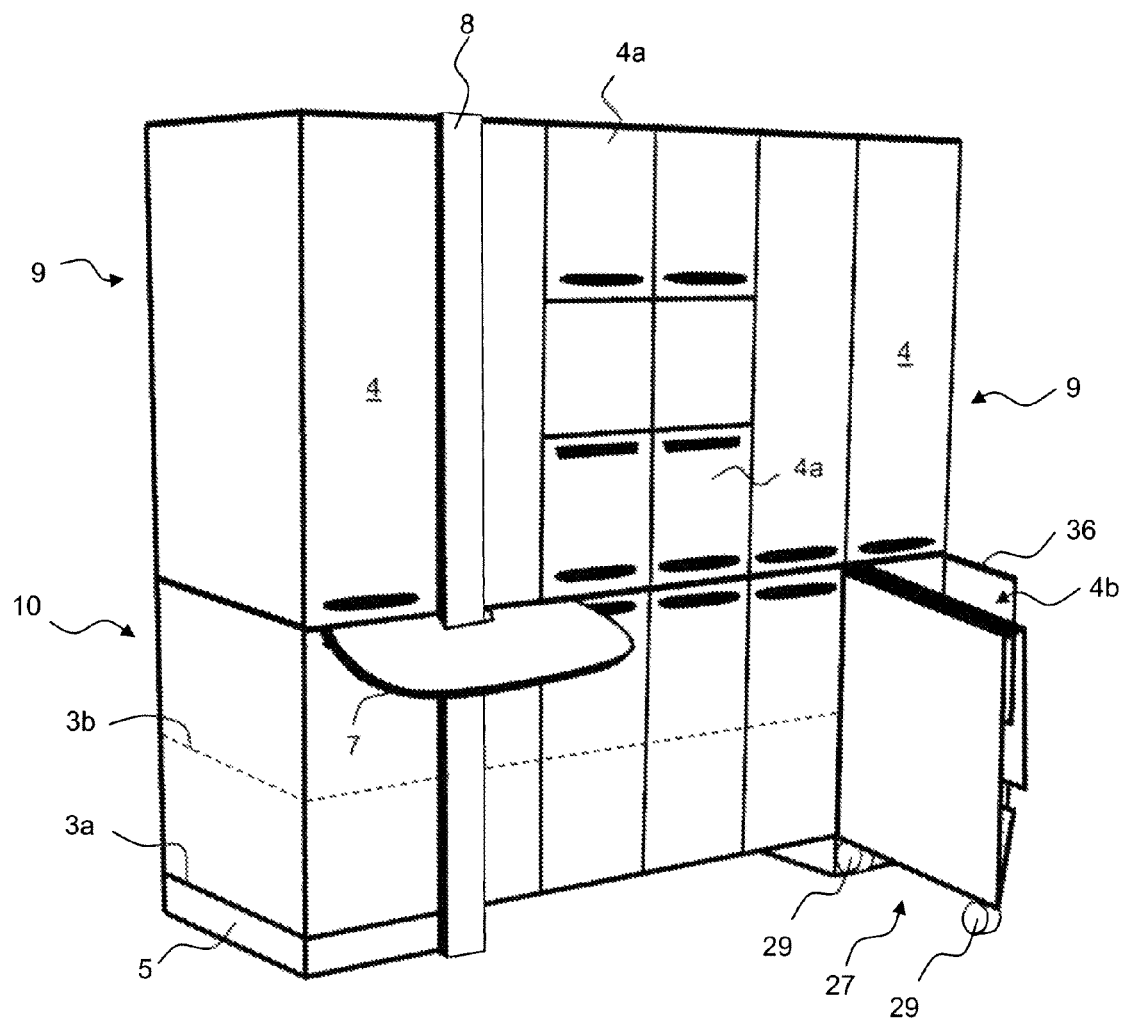
FIG. 7 is another schematic overall perspective view of the galley body of the galley unit according to the present invention showing the service cart in its folded position partly accommodated in the galley body.

The benefit of a foldable cart will be immediately appreciated with regard to FIG. 7. Such cart 27 takes up much less storage space when it is not in use compared to a conventional trolley, so that in the galley according to the disclosed embodiments only one composite compartment may suffice to accommodate the folded cart leaving the other compartments unoccupied and available for other goods. Depending on the residual width of the folded cart there may even be two or more carts accommodated in one single compartment. It should be noted here that in prior art galleys the storage space for trolleys may require up to half of the lower part galley body. In the embodiment in FIG. 7 the folded cart according to the disclosed embodiments is stowed away in a single standard compartment 4b that is equivalent to the composite compartments from above, namely that it comprises two compartment units or unit cells on different shelves 3a and 3b above each other yet requires only one standard width "w". Hence the compartment 4b for the service cart has the same size as the compartments 4 explained above with regard to FIGS. 2 and 3. However in this embodiment the composite compartment 4b is adapted to accommodate said service cart 27 in its folded position and it is therefore open to the floor 2 so that the folded cart can be brought into said compartment 4b on its rollers 29 without having to lift it. In addition the compartment 4b is furnished with a hinged door 36 (hinges at its side) which may be opened by rotating around a vertical axis in the front plane of the galley body 1, in order to avoid any obstacles for the folded cart 27 when bringing it into the compartment 4b. As an alternative the door may be slidable.

In FIG. 7 there is only one body rest 5 on the left hand side, the corresponding rest on the right hand side in FIG. 7 coincides with the cart compartment 4b. In this embodiment the load of the galley body 1 on its right hand side is taken over by the remaining side walls of the compartment 4b or by adjacent frames (not shown) which of course have to be appropriately designed then.

The galley body 1 according to the disclosed embodiments could thus provide for new service facilities without decreasing space for passenger seats and other devices or increasing the overall weight.

With the above galley arrangement catering for flight passengers of an aircraft is much improved. In general catering for flight passengers comprises the basic steps of storing goods in a plurality of trolleys and boxes which is mainly performed at a caterer's premises. The loaded and prepared trolleys and boxes are transported then by vehicles such as vans to a respective airport in order to be delivered to a particular air carrier. As well as the boxes the trolleys are boarded on the aircraft and are used as transport means for boxes to and from the galley units as well as storage containers in the galley body. In particular the trolleys may be cooled as a whole. This however requires that the cooling facilities are decisively located in the lower compartments. A large number of trolleys are required and that again leads to large galley footprints in the cabin with the according additional weight. Since further the prior art trolleys are voluminous and unwieldy the crew cannot efficiently use the trolleys for storage due to limited access to the trolleys. When the boxes are loaded, moreover, rather a great strain is necessary and the boxes are difficult to handle for the crew which is again uneconomical. As mentioned above from this a great variety of individual work processes ensue such as packing and repacking goods which is time consuming and tedious for the crew.

With the galley according to the disclosed embodiments the problem of a large number of trolleys is solved by having foldable carts that can be used multiple times to distribute the goods that are stored in the boxes to the passengers on board. In addition by introducing cooling facilities also in the upper compartments and by more efficient storage of the bottles the galley footprints can be made more compact.

The introduction of the transfer table enables the upper compartments to be used more efficiently for storage purposes. All aspects according to the disclosed embodiments lead to significant savings of cabin space and weight while contributing to better ergonomics in the work environment. Basically these benefits may be allocated to all storage and transportation means being standardized, namely that the compartments 4 are optimized in their shape and volume and that their horizontal and vertical dimensions are equal to an integer multiple of the respective dimensions of a single one of said standard boxes 12.

In a preferred embodiment the service cart 27 is folded after all standard boxes 12 have been loaded and unloaded, respectively, and the service cart 27 in its folded state is eventually accommodated in a predetermined compartment 4b and retrieved from said predetermined compartment 4b, respectively, when the boxes are to be discharged from the aircraft.

It should be noted that the disclosed embodiments are not limited to the above described embodiments. E.g. one may have a galley body 1 that is 3 (or more) boxes deep instead of only two boxes. Such embodiment may prove beneficial particularly in the layout of aft & cargo hold galley installations where the available storage room is more important than ergonomic considerations.

Reference Numerals
1 galley body (monument)
2 cabin floor
3 vertical levels (3a-3e)
4 compartment; 4a compartments with electric appliances, 4b service cart compartment
5 galley body rest
6 ventilation slots
7 transfer table in its idle position
8 single support for transfer table
9 upper galley body part
10 lower galley body part
11 hatch for boxes
12 standard transportation/storage box; 12a box in front, 12b box in the rear
13 box handle
14 compartment door, slidable in horizontal direction
15 compartment door grip
16 rails for boxes with sliding mechanism (20) in said compartment
17 open compartment for pots, jugs and carafes, preferably closed by vertical blinds
18 pot, jug, carafe for beverages
19 tray for pots, extractable
20 transfer table (6) in its operational position
21 open work recess/niche
22 work surface/work top on lower galley body part in niche
23 service island
24 composite compartment
25 composite compartment frame
26 frame base 27 service cart in its set up position, semi-folded position, folded position
28 bottom plate
29 rollers
30 first side plate
31 second side plate
32 removable upper part of second side plate
33 lower part of second side plate
34 top plate
35 reinforcement plate/spacer
36 hinged compartment door

The invention claimed is:

1. A galley unit for an aircraft comprising:
   a galley body being fixed on a cabin floor for accommodating a plurality of storage boxes and appliances; and
   a plurality of storage boxes for storing goods;
   wherein said galley body has a plurality of vertical levels that are substantially equidistant from each other, wherein each of said vertical levels is subdivided into a plurality of laterally adjacent compartments for accommodating the storage boxes, wherein the horizontal and vertical dimensions of said compartments are equal to an integer multiple of the respective dimensions of a single one of said storage boxes, and
   wherein a transfer table is mounted in front of said galley body slidable in vertical and horizontal directions.

2. The galley unit according to claim 1, wherein said galley body is subdivided into an upper part and a lower part with predetermined upper part compartments having a depth that is smaller than the depth of the lower part compartments so as to define a work recess above said lower part compartments.

3. The galley unit according to claim 1, wherein predetermined compartments on at least two different vertical levels above each other are combined to form a composite compartment.

4. The galley unit according to claim 3, wherein said composite compartment comprises a compartment frame for accommodating a plurality of boxes and a frame base underneath said frame so as to render said composite compartment extractable from said galley body as a service island.

5. The galley unit according to claim 3, wherein said at least two different levels above each other are the two lowest levels in said galley body and said frame base is adapted to support said frame on the cabin floor.

6. The galley unit according to claim 3, wherein said composite compartment is open to the cabin floor so that a service cart may be inserted into said composite compartment.

7. The galley unit according to claim 6, wherein said service cart may take on either a folded position or a deployed position and at least one compartment is adapted to accommodate said service cart in its folded position.

8. The galley unit according to claim 1, wherein the lowest of said multiple vertical levels is positioned at least partly in a predetermined distance above said floor so as to accommodate at least one inlet/outlet port underneath said lowest level which inlet/outlet port is connected to at least one predetermined compartment for air supply.

9. The galley unit according to claim 1, wherein each of predetermined compartments comprises a hatch with a compartment door that closes flush with the galley body in a closed position and opens said hatch in an open position.

10. The galley unit according to claim 1, wherein each of a predetermined number of compartments is configured to accommodate two boxes being successively arranged one behind the other and comprises a sliding mechanism with a push/pull mechanism for automatically releasing the box in the rear of the compartment when the box in the front of the compartment has been discharged.

11. The galley unit according to claim 1, wherein said transfer table is mounted to a single support.

12. The galley unit according to claim 1, wherein said transfer table has an operational position being substantially horizontal and an idle position being substantially vertical with respect to said galley body.

13. The galley unit according to claim 1, wherein electric appliances are provided in predetermined compartments and wherein said appliances are electric heaters, electric freezers or electric ovens.

14. The galley unit according to claim 13, wherein said electric appliances are "plug-and-play" appliances.

15. The galley unit according to claim 1, wherein standardized electric, water and heat pipe connectors are provided in a predetermined number of compartments.

16. A method of catering for passengers on an aircraft using the galley unit of claim 1, the method comprising:
    storing goods in a plurality of storage boxes;
    conveying a plurality of said storage boxes to and from said galley unit;
    accommodating a plurality of said storage boxes, appliances in the galley body of said galley fixed on the cabin floor;
    providing standard boxes as said plurality of storage boxes having a predetermined width (w), a predetermined depth (d) and a predetermined height (h); and
    transporting said standard boxes to their respective destination compartment in said galley body and stowing them therein, wherein the horizontal and vertical dimensions of each of said compartments are equal to an integer multiple of the respective dimensions of a single one of said standard boxes.

17. The method according to claim 16, further comprising providing at least one service cart of which the horizontal and vertical dimensions are equal to an integer multiple of the respective dimensions of a single one of said standard boxes;
    arranging said standard boxes in said at least one service cart, conveying said standard boxes to said galley by said service cart; and
    discharging said standard boxes from said at least one service cart for transport.

18. The method according to claim 16, further comprising:
    providing at least one transfer table for transport of said standard boxes and
    mounting said standard boxes from said at least one service cart on said transfer table for transport.

19. The method according to claim 16, further comprising:
    folding and unfolding said service cart after all standard boxes have been loaded and unloaded, respectively; and
    accommodating said service cart in its folded state in a predetermined compartment and retrieving said service cart in its folded state from said predetermined compartment, respectively.

* * * * *